US012298145B2

(12) United States Patent
Telpaz et al.

(10) Patent No.: US 12,298,145 B2
(45) Date of Patent: May 13, 2025

(54) FLEET TELEMETRY DATA SOURCING AND EVALUATION TOOL

(71) Applicant: GM GLOBAL TECHNOLOGY OPERATIONS LLC, Detroit, MI (US)

(72) Inventors: Ariel Telpaz, Givat Haim Meuhad (IL); Refael Blanca, West Bloomfield Township, MI (US); Zahy Bnaya, Petach Tikva (IL); Laura Chmielewski, Beverly Hills, MI (US); Michelle L. Calloway, Northville, MI (US); Neeraj R. Gautama, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 18/098,956

(22) Filed: Jan. 19, 2023

(65) Prior Publication Data
US 2024/0263957 A1    Aug. 8, 2024

(51) Int. Cl.
*G01C 21/36* (2006.01)
*G01C 21/34* (2006.01)

(52) U.S. Cl.
CPC ..... *G01C 21/3617* (2013.01); *G01C 21/3469* (2013.01); *G01C 21/3492* (2013.01)

(58) Field of Classification Search
CPC .................................................. G01C 21/3617
See application file for complete search history.

(56) References Cited

U.S. PATENT DOCUMENTS

| 2007/0005404 | A1* | 1/2007 | Raz | G06Q 40/08 705/4 |
| 2011/0300894 | A1* | 12/2011 | Roberts, Sr. | G06Q 10/08 370/352 |
| 2013/0184035 | A1* | 7/2013 | Roberts, Sr. | G06Q 10/08 455/566 |
| 2014/0047347 | A1* | 2/2014 | Mohn | G07C 7/00 715/738 |
| 2015/0248795 | A1* | 9/2015 | Davidson | G01C 21/34 701/1 |
| 2016/0104107 | A1* | 4/2016 | Disorbo | G06Q 10/087 705/28 |

(Continued)

FOREIGN PATENT DOCUMENTS

| AU | 2017100444 A4 * | 5/2017 | ............ B60W 40/09 |
| CA | 2919246 A1 * | 12/2011 | ............ G06Q 10/08 |

(Continued)

*Primary Examiner* — Shelley Chen
(74) *Attorney, Agent, or Firm* — Quinn IP Law (57) ABSTRACT

A system and method for determining driver assignments based on fleet trips history logs is presented. The system and method include receiving, at a server or online platform, a set of fleet driver requirements from a fleet owner. The server receives fleet trip data from a vehicle with an integrated communication device where a weighted trip score for a driver based on a particular fleet owner is determined. The server also ranks one or more drivers, based on the weighted trip score, that best matches the fleet driver requirements. The weighted trip score is determined based on the fleet trip data received from the integrated communication device in the vehicle where the fleet trip data includes at least a start trip information, a trip log, an event trigger, and an end of trip data.

19 Claims, 8 Drawing Sheets

FIG. 2

(56) References Cited

U.S. PATENT DOCUMENTS

| | | | | |
|---|---|---|---|---|
| 2016/0117638 A1* | 4/2016 | DiSorbo | ............. | G06Q 10/083 |
| | | | | 705/333 |
| 2018/0012151 A1* | 1/2018 | Wang | ..................... | G06Q 10/08 |
| 2019/0197437 A1* | 6/2019 | Wang | ..................... | G06Q 10/02 |
| 2021/0286651 A1* | 9/2021 | Ho | ........................ | G06F 3/0647 |
| 2022/0169258 A1* | 6/2022 | Samarthyam | ............ | H04L 67/12 |
| 2022/0324461 A1* | 10/2022 | Kuehnle | ............. | G01C 21/3617 |
| 2023/0066046 A1* | 3/2023 | Wolff Westrup | ..... | G06Q 50/265 |

FOREIGN PATENT DOCUMENTS

| | | | | | | |
|---|---|---|---|---|---|---|
| CA | | 3034405 | A1 * | 3/2018 | ............. | G06Q 10/02 |
| CA | | 3042178 | C * | 11/2023 | ........ | G06Q 10/06311 |
| CN | | 103827925 | A * | 5/2014 | ......... | G01C 21/3469 |
| EP | | 3507751 | B1 * | 11/2024 | ....... | G06Q 10/06311 |
| WO | WO-2016182628 | A1 * | 11/2016 | ............. | G01C 21/34 |
| WO | WO-2016183525 | A1 * | 11/2016 | ............. | B60W 30/00 |
| WO | WO-2022184787 | A1 * | 9/2022 | ......... | G01C 21/3469 |
| WO | WO-2023014211 | A1 * | 2/2023 | | |

\* cited by examiner

TRIP DATA 310

START TRIP INFO
- Vehicle Model/MY
- Driver
- Fleet
- Weight sensor
- Trailer info

TRIP LOGS
- Location
- Speed
- Odometer
- Lane used

EVENT TRIGGERS
- Hard Brakes
- Hard Acceleration
- Headway Distance
- Horn Activation
- High-beam flashing
- Cornering

END OF TRIP
- Consumed Fuel/Energy
- Speeding data
- Trip Distance

FUEL/ENERGY EFFICIENCY SCORE 320

- Average MPG/MPkWh per Vehicle Model & MY
- Trip Speed Profile (Urban, intercity, highway)

Regression Formula
- Weight
- Trailer

Acceptable Fuel/Energy Consumption Trip Consumed Fuel/Energy

SAFETY/AGRESSIVENESS MEASURES SCORE 330

- # Hard Brakes (HB)
- # Hard Accelerations (HA)
- Mean Velocity for HB
- Mean Velocity for HA
- % Speed above threshold (unacceptable speed levels)
- # Horn Activation
- # high beam flash activation
- # events of risky headway distance
- # Harsh cornering Speed dependent HB/HA scores Aggressiveness score % Left Lane (passing lane)

MAINTENANCE SCORE 340

- # Harsh cornering
- # Harsh Braking
- # Harsh Acceleration
- # Speed
- # Harsh Braking Tire Wear Score Brake Pad wear Score

NORM REFERENCE GRADING 350 (standardized score)

Distance from acceptable MPG/MPkWh

Distance from mean aggressiveness score

Distance from mean Maintenance score

*Weighted Trip Score 360*

FLEET TELEMETRY DATA SOURCING AND EVALUATION TOOL

INTRODUCTION

Vehicles are rapidly integrating ever increasing technological components into their systems. Special use microcontrollers, technologies, and sensors may be used in many different applications in a vehicle. Automotive microcontrollers and sensors may be utilized in enhancing automated structures that offer state-of-the-art experience and services to the customers, for example in tasks such as body control, camera vision, information display, security, autonomous controls, etc. Further, such technology may be used by fleet owners to assist in their operations.

Driver monitoring techniques are frequently used among fleet operations to assess driver performance. Fleet owners are concerned with multiple aspects of driving performance involving operational factors and fuel/energy efficiency that affect maintenance costs. However, obtaining such data for fleet drivers is not always possible. Further, without such data for fleet drivers, fleet owners and their recruiters cannot easily identify candidates that meet the fleet requirement needs based on objective driving performance scores.

SUMMARY

Disclosed herein is a fleet telemetry data sourcing and evaluation tool based on data retrieved from a vehicle. Telemetry-based indicators allow for the ability to establish an objective score for multiple aspects of driving performance involving aggressiveness, fuel/energy efficiency and the associated maintenance costs. These indicators may be further calibrated per vehicle type and additional driving conditions. Driving performance indicators for establishing score certificates for fleet drivers may be uploaded to an online platform where, using the online platform, fleet owners may identify candidates that meet the fleet requirement needs based on an individual's driving performance objective scores. Recruiters may also submit their requirements for a fleet driver position and the platform may output the drivers with the highest fit. Further, an artificial intelligence-based solver may automatically detect the drivers that best fit the requirements of the fleets as learned from fleet trips history logs.

Thus, a system for determining driving assignments based on fleet trips history logs may include an online platform designed to receive one or more fleet driver requirements. Further, the system may also include a vehicle equipped with an integrated communication device where the online platform may be communicatively coupled to the integrated communication device to exchange fleet trip data between the integrated communication device and the online platform. The online platform may also determine a weighted trip score for a driver based on a particular fleet owner. The online platform may also determine one or more drivers, based on the weighted trip score, that best matches the one or more fleet driver requirements. In addition, the weighted trip score may be determined based on the fleet trip data received from the integrated communication device. Furthermore, the fleet trip data received from the integrated communication device may include at least a start trip information, a trip log, an event trigger, and an end of trip data.

Another aspect of the disclosure may include where the online platform may present, in a user interface, a plurality of possible fleet drivers based on the weighted trip score of each fleet driver.

Another aspect of the disclosure may include where the weighted trip score is further based upon an aggressiveness factor, an energy usage factor, and a maintenance factor.

Another aspect of the disclosure may include where the trip log includes a location, a speed, an odometer reading, and a road lane used data.

Another aspect of the disclosure may include where the road lane used data includes a percentage of time the vehicle travels in a highspeed passing lane.

Another aspect of the disclosure may include where the event trigger includes a hard brake occurrence, a hard acceleration occurrence, a headway distance occurrence, a horn activation occurrence, a high beam flashing occurrence, and a cornering occurrence.

Another aspect of the disclosure may include where the end of trip data includes an amount of consumed fuel or energy, an amount of speeding data, and a trip distance measurement.

Another aspect of the disclosure may include where an aggressive driving score includes a brake level and an acceleration level dependent on a speed level of the vehicle.

Another aspect of the disclosure may include where the weighted trip score is further based on a vehicle type, a trailer information, and a type of road.

Another aspect of the disclosure may include where the maintenance factor includes a tire wear score and a brake pad wear score.

Another aspect of the disclosure may include a method for determining driver assignments based on fleet trips history logs including receiving, at a server, one or more fleet driver requirements and receiving, at a server, a fleet trip data from a vehicle with an integrated communication device. The method may also include determining, at the server, weighted trip score for a driver based on a particular fleet owner. The method may include determining, at the server, one or more drivers, based on the weighted trip score, that best matches the one or more fleet driver requirements, where the weighted trip score may be determined based on the fleet trip data received from the integrated communication device and where the fleet trip data received from the integrated communication device may include at least a start trip information, a trip log, an event trigger, and an end of trip data.

Another aspect of the method may include where the weighted trip score is based upon an aggressiveness factor, an energy usage factor, and a maintenance factor.

Another aspect of the method may include where the trip log includes a location, a speed, an odometer reading, and a road lane used data.

Another aspect of the method may include where the road lane used data includes a percentage of time the vehicle travels in a highspeed passing lane.

Another aspect of the method may include where the event trigger includes a hard brake occurrence, a hard acceleration occurrence, a headway distance occurrence, a horn activation occurrence, a high beam flashing occurrence, and a cornering occurrence.

Another aspect of the method may include where the end of trip data includes an amount of consumed fuel or energy, an amount of speeding data, and a trip distance measurement.

Another aspect of the method may include where an aggressive driving score includes a brake level and an acceleration level dependent on a speed level of the vehicle.

Another aspect of the method may include where the weighted trip score is further based on a vehicle type, a trailer information, and a type of road.

Another aspect of the method may include where the maintenance factor includes a tire wear score and a brake pad wear score.

Another aspect of the disclosure may include a method for determining fleet driver assignments including initiating, from a vehicle with an integrated communication device, a communication with a server. The method may also include sending, to the server, a fleet trip data including at least a trip log, an event trigger, and an end of trip data, where, the server may determine a weighted trip score, based on the fleet trip data, for a driver based on a particular fleet owner.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
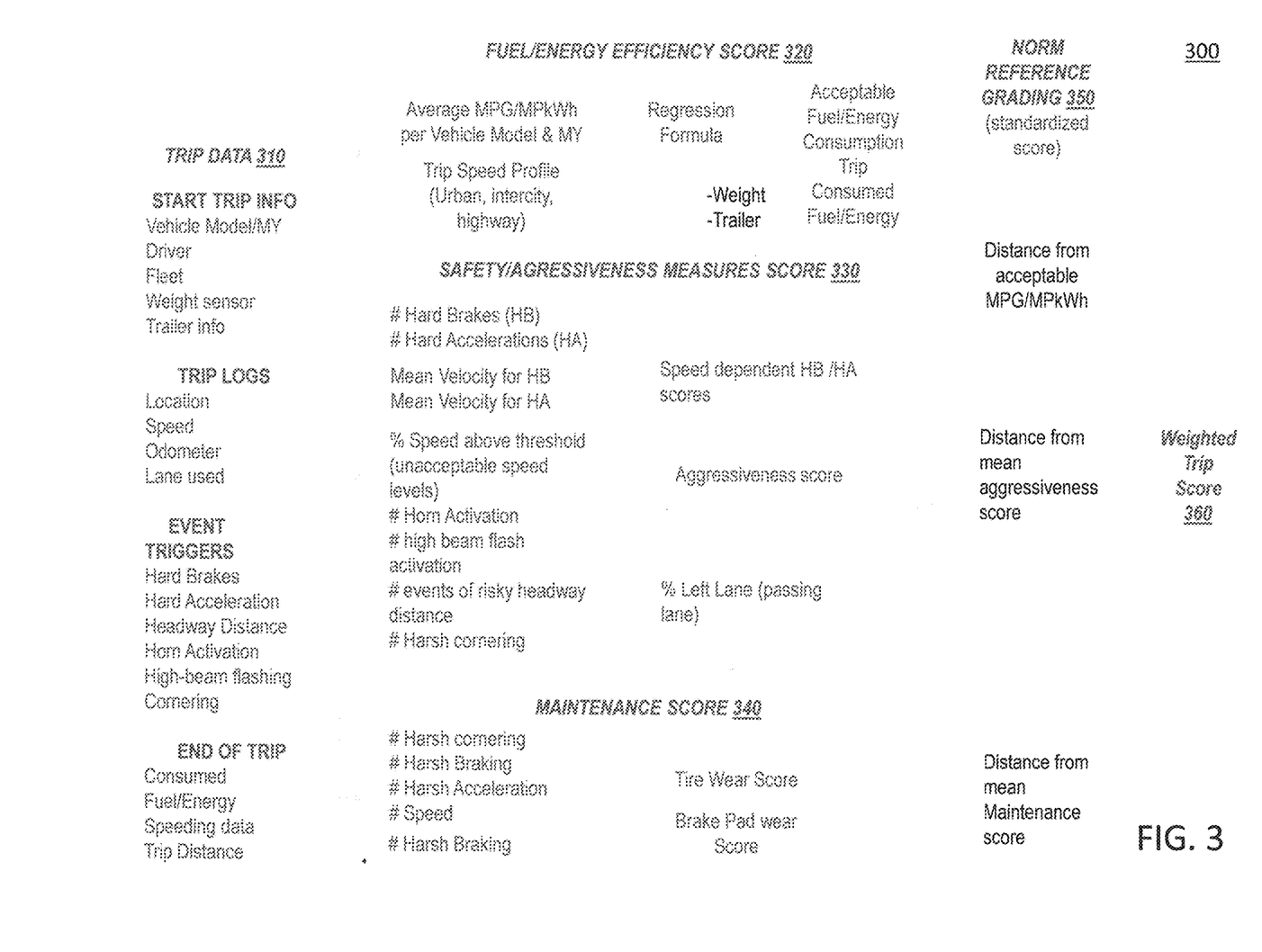
FIG. 3 is a flowchart of a system for determining a fleet driver score model, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information of the vehicle, including, for example, location, automatic assistance sensors, occupancy data, motion sensors, to name a few. These systems may also provide detailed data as to the operation of a vehicle, knowledge that may not be aware of by its occupants. Such information may be compiled, through the cloud, onto an online platform for further analysis. For example, a fleet owner, may collect vehicle data for a particular driver to ascertain that driver's driving style and habits to determine a driver profile. The online platform may then compare the requirements of a fleet owner with the driver profiles of a number of drivers to create a best-case match of attributes and requirements.

Figure 1:
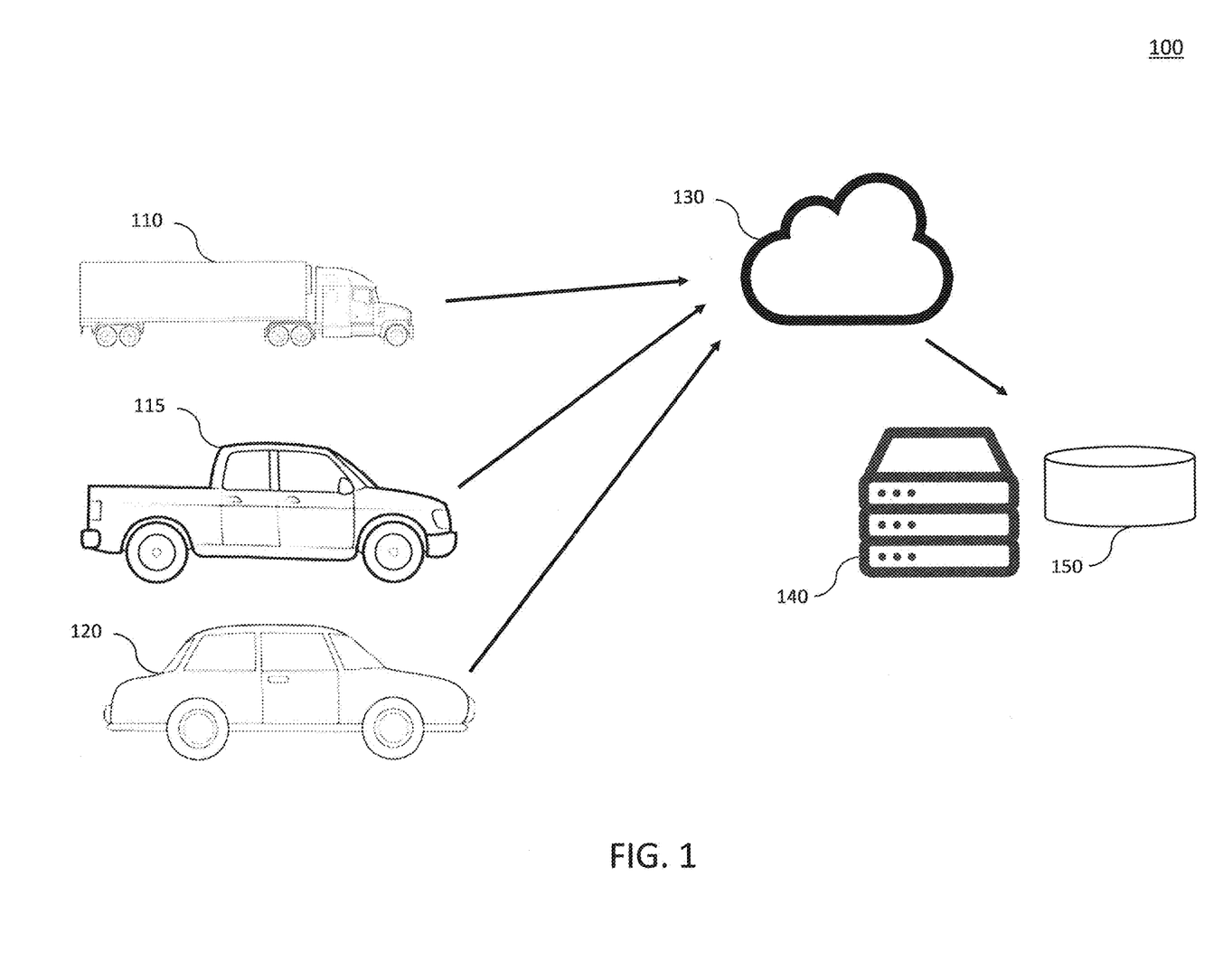
FIG. 1 is an illustration of a vehicle fleet telemetry system, in accordance with the disclosure.

FIG. 1 is an illustration of a vehicle fleet telemetry system 100, according to an embodiment of the present disclosure. System 100 may include a fleet of vehicles including different type and styles of vehicles, for example a tractor-trailer 110, a truck 115, or a two door or four door sedan 120 or other type of vehicles. The vehicle may communicate through the Internet, for example as shown by cloud 130, to an online platform 140 that includes storage 150. System 100 may be structured such that vehicles, for example tractor-trailer 110, truck 115, or the sedan 120, through internal sensors, controllers, and processors may gather information regarding the driver's driving performance. Such information may include trips data that may be analyzed for attributes such as aggressiveness, fuel/energy efficiency, and associated maintenance costs based on the type of vehicle being driven and the types of roads on which the vehicle travels. Such information may then be sent through the cloud 130 to servers, such as the online platform 140 and storage 150. Also, a history of trips may be stored in storage 150 for further analysis.

Figure 2:
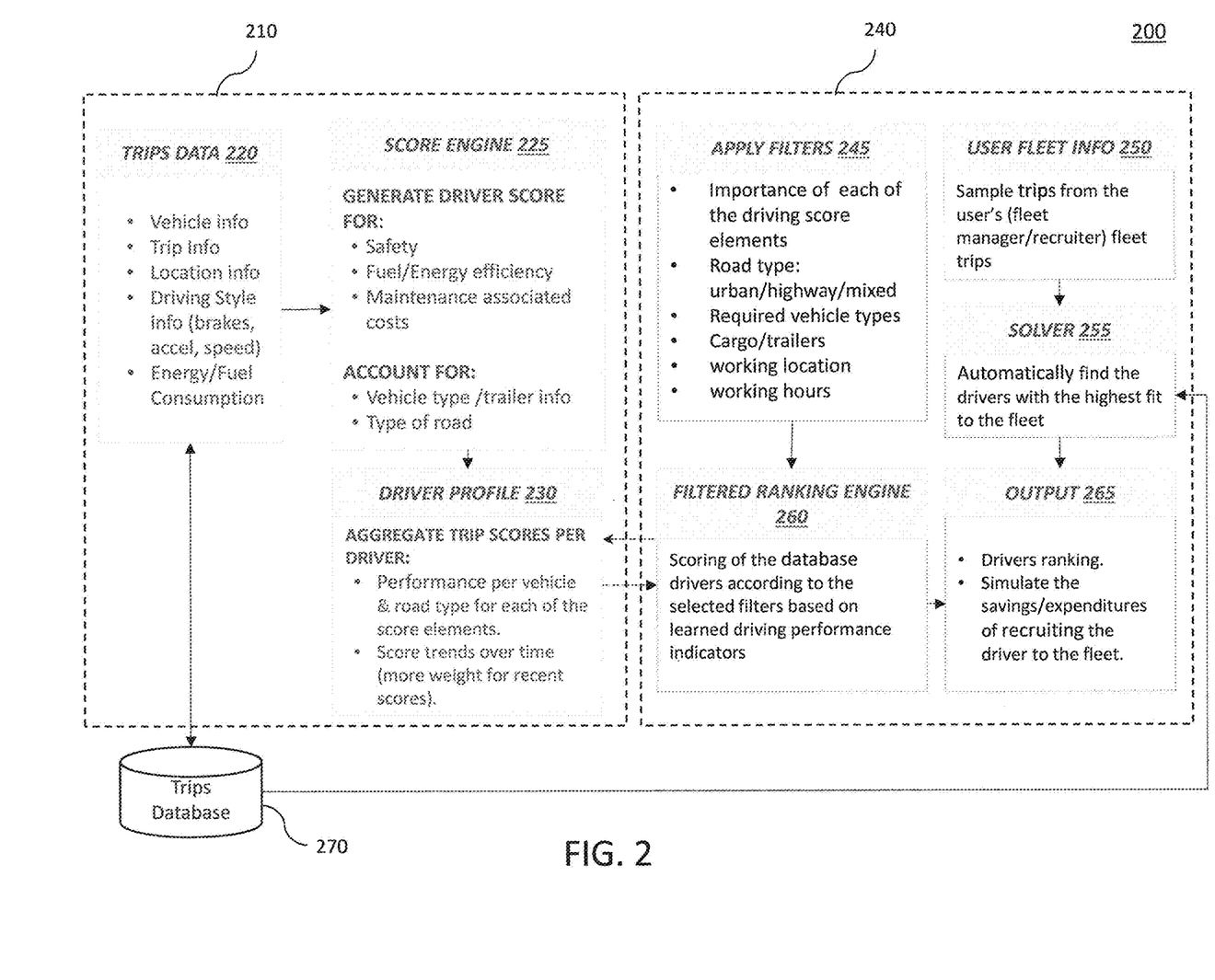
FIG. 2 is a flowchart of a system for a telemetry data sourcing and evaluation tool, in accordance with the disclosure.

FIG. 2 illustrates a flowchart of a system 200 for telemetry data sourcing and evaluation, according to an embodiment of the present disclosure. System 200 may include a driver score model 210 and a driver search engine module 240 and trips database 270. The driver score model 210 may include a trips data module 220, a score engine 225, and a driver profile module 230. Trips data module 220 may receive trip data from a vehicle, such as tractor-trailer 110, truck 115, or sedan 120, that is captured by each vehicle through integrated sensors, controllers, and processors. Trips database 270 may also include historical trip data including vehicle information such as the type and model of the vehicle as will be discussed in further detail in FIG. 3. Trips data module 220 may also access specific trip information including the current or historical location of the vehicle. Trips data module 220 may analyze data from the trips database 270 to generate a driving style designation for a driver of the vehicle. Such a style designation may include multiple factors such as usage of the brakes, the intensity of acceleration, speed, and other associated factor. Trips data module 220 may also generate an energy efficiency rating, e.g., the amount of battery energy used in a trip in an electric vehicle, or a fuel efficiency rating, e.g., the amount of gasoline or diesel fuel used in a trip, or a combination of both, e.g., in the case of a hybrid vehicle.

The information gathered and generated by the trips data module 220 may then be passed to the score engine 225. Score engine 225 may then generate, based on the output data from trips data module 220, a driver's score for aggressiveness, fuel/energy efficiency, and the associated maintenance costs. Score engine 225 may generate scores for multiple driver's including multiple drivers of the same vehicle. Further, the score engine 225, in generating a driver score, may take into account additional factors such as the type of vehicle being used and if a trailer is involved in addition to the types of roads being used. For example, a tractor trailer may not be as fuel/energy efficient as a two-door compact vehicle.

Driver profile module 230 may then, based on the output data of score engine 225, generate an aggregate trip score for each driver. For example, the score may indicate the performance of each vehicle and road type for each score element. Further, the aggregate trip score may also indicate trends over time with the ability to place more weight on the most recent scores. Driver profile module 230 may accept as input the output of the filtered ranking engine 260 that may provide a scoring of drivers with various filters and learned driving performance indicators. In some situations, the ability to send and/or receive driver data from driver profile module 230 may include or require the driver's consent.

Driver search engine module 240 may include an apply filters module 245 and a user fleet information module 250. Further, the apply filters module 245 and a user fleet information module 250 may include input from fleet managers or recruiters based on their specific requirements. Driver search engine module 240 may also include a solver module 255, a filtered ranking engine 260 and an output module 265. The apply filters module 245 may specify or indicate particular preferences. For example, different fleet managers or recruiters may place different degrees of importance on each of the driving score elements. In addition, there may be a desire to limit an analysis of drivers to a particular road type, e.g., an urban setting, a highway scenario, or a mixture. Further, an analysis may be limited to specific types of vehicles, or cargo, or trailers, or specific locations or times of day.

The user fleet information module 250 may be used to include sample trips from a specific fleet manager or recruiter's fleet trips. Solver module 255 may be used to automatically compare a driver's score with the fleet manager's, or recruiter's, requirements to rank drivers according to the requirements of the fleet manager or recruiter. Note, that as there may be multiple driving score elements, there may not be a single best fit, as will be discussed later. Filtered ranking engine 260, given the filters applied by the apply filters module 245, may score drivers according to the selected filters including being based on learned driving performance indicators. The output of the filtered ranking engine 260 and the solver module 255 are taken by the output module 265 to generate, in an embodiment, using a graphical user interface, a ranking of drivers that may also include an estimated set of savings and expenditures associated with adding a specific driver to the fleet.

FIG. 3 illustrates a detail flowchart 300 for determining a driver's weighted trip score, according to an embodiment of the present disclosure. FIG. 3 illustrates further detail of driver score model 210 discussed in FIG. 2. Flowchart 300 may include trip data 310, a fuel/energy efficiency score 320, an aggressiveness measures score 330, a maintenance score 340 and a normalized reference grading module 350, resulting in a weighted trip score 360.

Trip data 310 may include multiple categories of information that may be sent by the vehicle to a server or online platform. The received information may be classified as start trip information, trip log information, event trigger information, and end or trip information. Start trip information may include information about the vehicle, for example a vehicle make and model, including the model year. This information is stored within the vehicle's memory and controllers and may be sent to the online platform using an integrated communication device within the vehicle. Start trip information may also include information about the driver, for example the driver's name and other contact information. The information may also include data about the fleet, for example, the current fleet owner or operator associated with the vehicle. The information may also include information about an associated trailer, if applicable. Also, weight sensors on the vehicle may convey a weight of the vehicle and/or a weight of the trailer, if applicable.

Trip log information may include dynamic information such as the location of the vehicle throughout a trip, including data such as speed, odometer readings, and which lanes are being used. Event triggers may include instances of hard braking and hard acceleration. Triggers may also include a critical headway distance, where headway is defined as the average interval of time or distance between the vehicle and another vehicle in front of the vehicle. Triggers may also include when and how often the horn is activated and if the high beams of the headlights have been flashed. Also, using sensors and controllers on the vehicle, an amount of excessive cornering indicating excessive speed in a curved portion of the road may cause an event trigger. End of trip information may include the amount of fuel/energy consumed, speeding data, and trip distance.

The information from trip data 310 may be used by various modules to generate different types of scores, for example a fuel/energy efficiency score 320, an aggressiveness measures score 330, and a maintenance score 340. The fuel/energy efficiency score 320 may be generated by comparing the trip data 310 information with available data for a particular vehicle. For example, each vehicle model may have a published mean mile per gallon (MPG) figure. For example, vehicle 1 has a mean MPG of 12.272478 while vehicle 2 has a mean MPG of 20.023987, and vehicle 3 has a mean MPG of 19.045731, etc. Further, the trip speed logs of trip data 310 may be compared and classified as urban speed with a mean speed less than, for example, 50 kilometers per hour (kph), an intercity mean speed greater than 50 kph but less than 80 kph, and a highway speed of greater than 80 kph. The listed speeds are examples and are not meant to be limiting. The trip speed logs, and mean MPG of the vehicle may be processed by a trained regression model that also may account for weights of the vehicle and trailer, also weighting each factor, for example as follows:

$$\text{fuel} = w0 + w1 * p_{intercity} + w2 * p_{highway} - w3 * p_{urban} + w4 * \text{vehicle weight} + w5 * \text{trailer} + w5 * \text{vehicle\_model}_{MPG}$$

The trained regression model may then generate a fuel consumption score for the driver and vehicle on a trip and compare it to an assumed fuel consumption in terms of standard deviations. A distance from an acceptable MPG/MPkWh (miles per kilowatt hour) as shown in the normalized reference grading module 350 as follows:

$$Z_{fuel} = \frac{\text{fuel}_{trip} - \text{fuel}_{reg}}{SD}$$

The aggressiveness measures score 330 may include a number of factors, for example a speed dependent hard braking and hard acceleration component, a frequency of unacceptable actions e.g., excessive speed, horn usage, high beam flashes, risky headway distance, and harsh cornering, and a percentage of highspeed passing lane usage component.

The hard braking and hard acceleration components may be designed such that at higher velocities they carry a higher influence on the aggressive driving score. For example, a hard braking score may be calculated as follows:

$$HB_{score} = e^{x+\mu_{v\_hb}} * HB_{km}$$

A hard acceleration score may be calculated as follows:

$$HA_{score} = e^{y+\mu_{v\_ha}} * HA_{km}$$

An aggressiveness score may include the hard braking and hard acceleration scores above and may also be linearly combined with a number of unacceptable driving traits, for example a percentage of speed above predefined thresholds, and where the urban, intercity, and highway speeds previously discussed are exceeded, a number of horn activations, a number of high beam flash activations, a number of incidences of adverse headway distance, and a number of harsh cornering events. These factors, combined with a percentage of highspeed passing lane usage, e.g., left lane usage in the United States, may be used to construct the graph in FIG. 4.

Flowchart 300 may also include a maintenance score 340 that may indicate maintenance factors such as a tire wear score and a brake pad wear score. Brake pad wear score may use as inputs a driver's hard brake events. Regarding brake pad wear, the target variable may be the frequency of brake pad replacement. Regarding tire wear, inputs may include a number of harsh brake and acceleration events and a number of harsh cornering events where the target variable may be the frequency of tire replacement of another measurement of tire condition assessment.

Flowchart 300 may also include a normalized reference grading module 350 for generating a standardized score. For example, a distance from an acceptable MPG/MPkWh may be based on the outputs of the fuel/energy efficiency score 320. A distance from mean aggressiveness score may be based on the outputs from the aggressiveness measures score 330. And a distance from mean maintenance score may be based on the outputs from the maintenance score 340. These factors may be used to generate a weighted trip score 360, where the trip score reflects the distance of the trip driving performance from the average trip based on the three dimensions. A weight, w, may be used to reflect the weight that may be assigned to each of the measured trip quality indicators. For example:

$$\text{scoretrip} = w_{safety} * score_{safety} + w_{fuel} * (-)score_{fuel} w_{maintenance} * (-)score_{maintenance}$$

A goal may be to optimize the weights to create a model that best separates between drivers for increased reliability. This may be accomplished by using a trained model on a percentage of driver samples, storing a prediction accuracy, and modify weights, for example using a L-BFGS-B algorithm where:

$$\text{Optimize } [w_{fuel}, w_{aggressiveness}, w_{maintenance}]$$

Further, a driver score may be as simple as an average of the driver's overall trip score. However, in an embodiment, weightings may be used that give an exponential decay to the trip scores according to their time lag. For example, given trip scores at time t=1, . . . T, the weighting function may be shown as:

$w(t)=e-\gamma(T-t)$, where $\gamma$ is the decay of the weighting

Scores may also be adjusted by the driver's fleet quality to normalize for differences among fleets. In other words, the percentile of the drivers within its fleet instead of the percentile score of the driver relative to the entire fleet drivers' population. In addition, a driver's score may be further categorized by a vehicle type, a dominant road type, night versus day, and the use of trailers.

Figure 4:
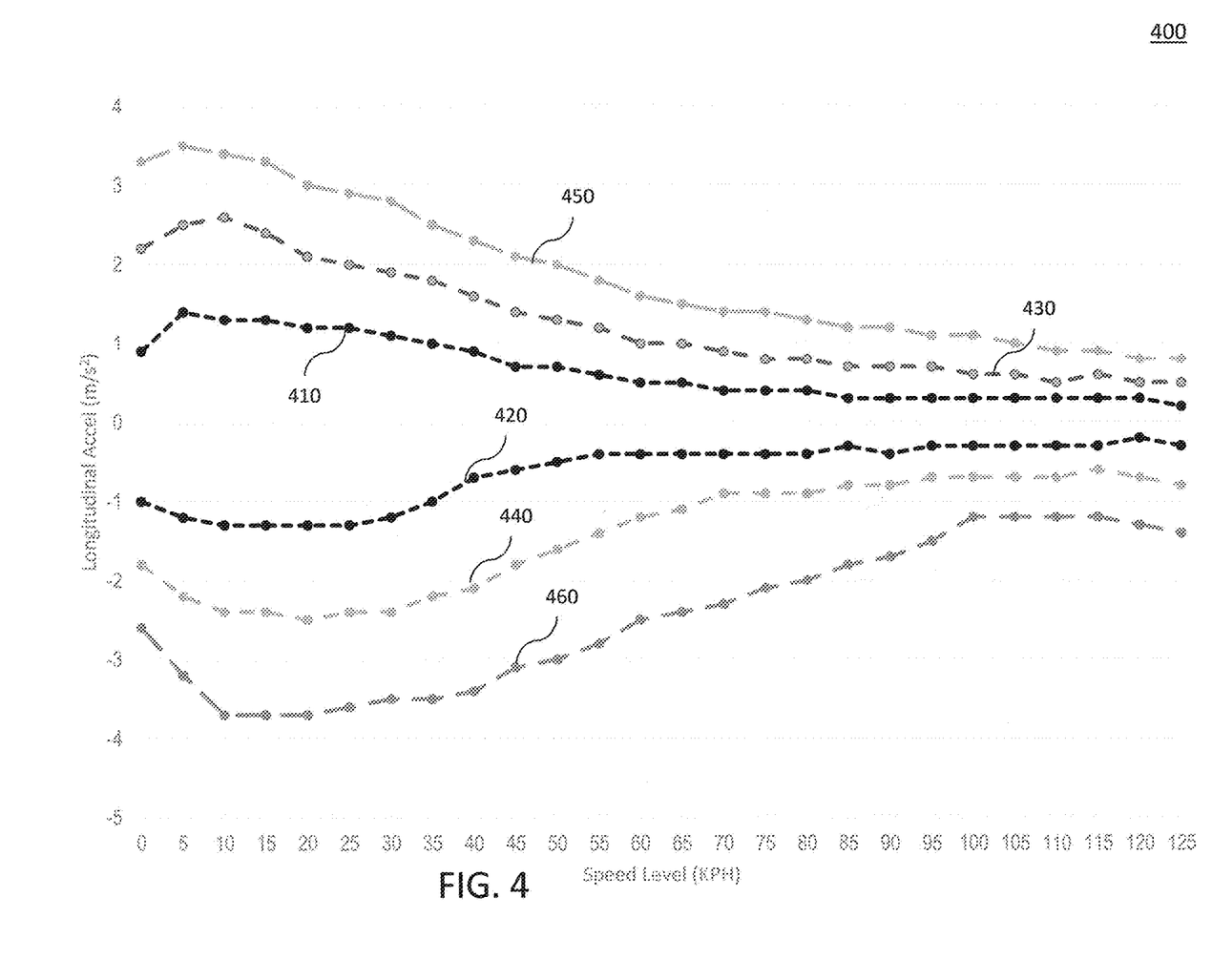
FIG. 4 is an aggressive driving score graph, in accordance with the disclosure.

FIG. 4 illustrates an aggressiveness driving score 400, according to an embodiment of the present disclosure. FIG. 4 illustrates a longitudinal acceleration in meters per second squared on the vertical axis plotted against a speed level in kilometers per hour on the horizontal axis. Graph line 410 and graph line 420 bound a target or acceptable level of aggressiveness. Graph line 430 and graph line 440 bound an area of a single standard deviation from a normal level of aggressiveness. Graph line 450 and graph line 460 bound an area of a double standard deviation from a normal level of aggressiveness, indicating an unusual level of aggressiveness.

Figure 5:
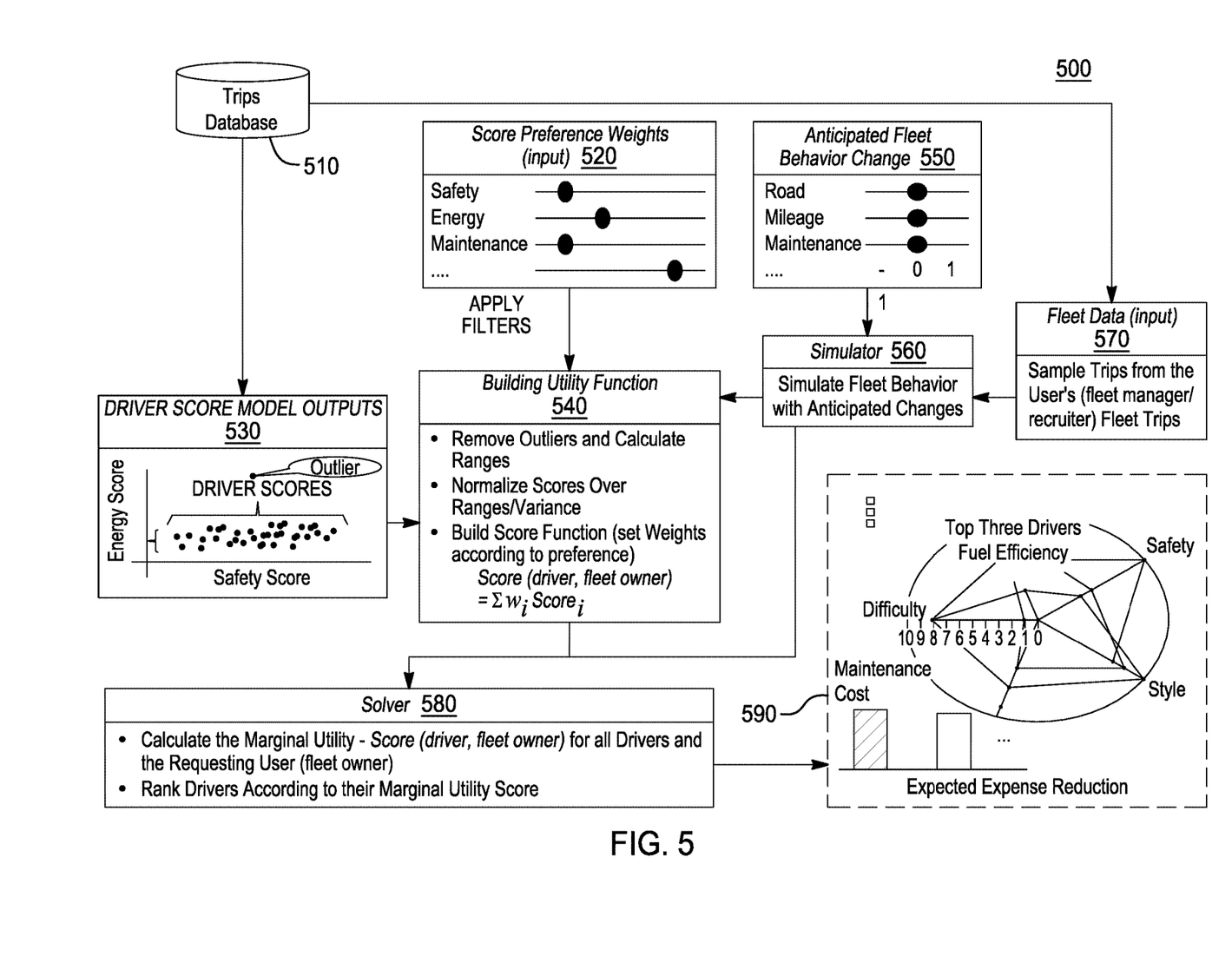
FIG. 5 is a driver search engine model, in accordance with the disclosure.

FIG. 5 illustrates a driver search engine model 500, according to an embodiment of the present disclosure. Driver search engine model 500 may include a trips database 510, a score preference weights input 520, a driver score model outputs 530, a building utility function 540, an anticipated fleet behavior change module 550, a simulator module 560, a fleet data input 570, a solver 580 and an output 590. The score preference weights input 520 may be used to accommodate a fleet owner's preferences. For example, drivers may be scored differently for different fleet owners. Different fleet owners may have different preferences for factors such as aggressiveness, energy, and maintenance. Thus, it may be possible to calculate relative importance weights for scores w, for a particular fleet owner. Further, driver score model outputs 530 may receive trip data from the trips database 510, and for each score dimension, may remove outliers and calculate score ranges. Outputs from the driver score model outputs 530 and score preference weights input 520 may be used by building utility function 540 to build a score function by setting weights according to preferences as follows:

$$\text{Score (driver, fleet owner)} = \sum w_i \frac{\text{Score}_i(\text{driver}) - \min(\text{score}_i)}{|\text{Score}_i|}$$

Search engine model 500 may also include a simulation component to enable a fleet owner to model possible changes using the anticipated fleet behavior change module 550, where for example the effects of a change in a weight factor for a road type, mileage, and maintenance, or other factors may be selected and then in simulator module 560 those changes, given fleet data input 570 of sample trips from the fleet manager, or recruiter, fleet trips, may generate a predicted outcome. Results of the simulator module 560 and building utility function 540 may be used by solver 580 to calculate a marginal utility for the drivers and a fleet owner. In addition, solver 580 may then rank drivers according to their marginal utility score. Output 590 illustrates a spider graph of different users with their individual scores and expected expense reductions.

Figure 6:
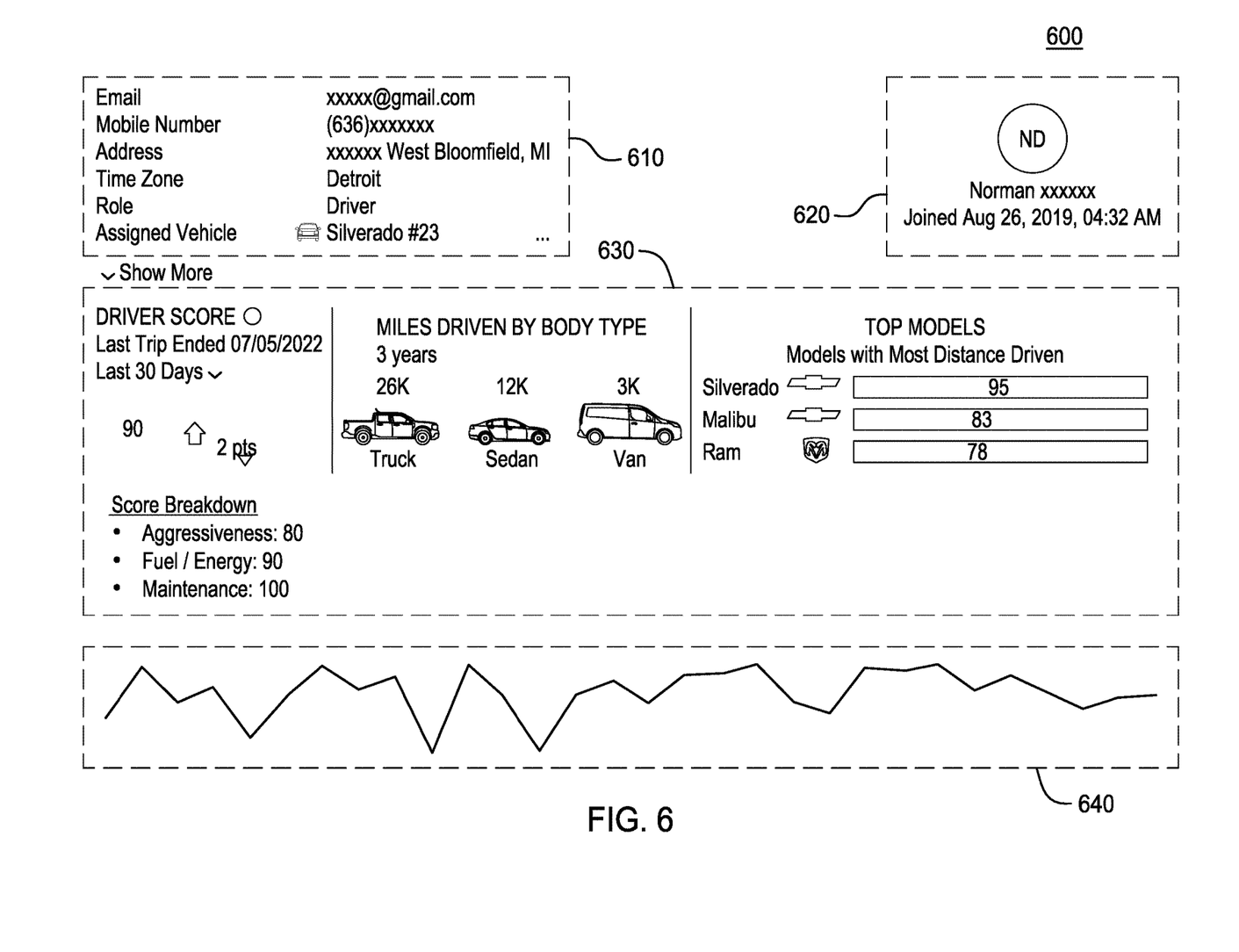
FIG. 6 is a graphical user interface of user information and scoring data, in accordance with the disclosure.

FIG. 6 illustrates a graphical user interface 600 of results of a driver search engine module, according to an embodiment of the present disclosure. Graphical user interface 600 includes a personal information block 610, a user status block 620, a driver score detail block 630, and a graphic block 640 showing a weighted trips score over time. Block 610 may include contact information including the current assigned fleet vehicle. Block 620 illustrates a current status and member information. Block 630 illustrates a driver score and detail for the latest trip including some historical information by vehicle body type and model. Block 640 illustrates a history of driver scores over time.

Figure 7:
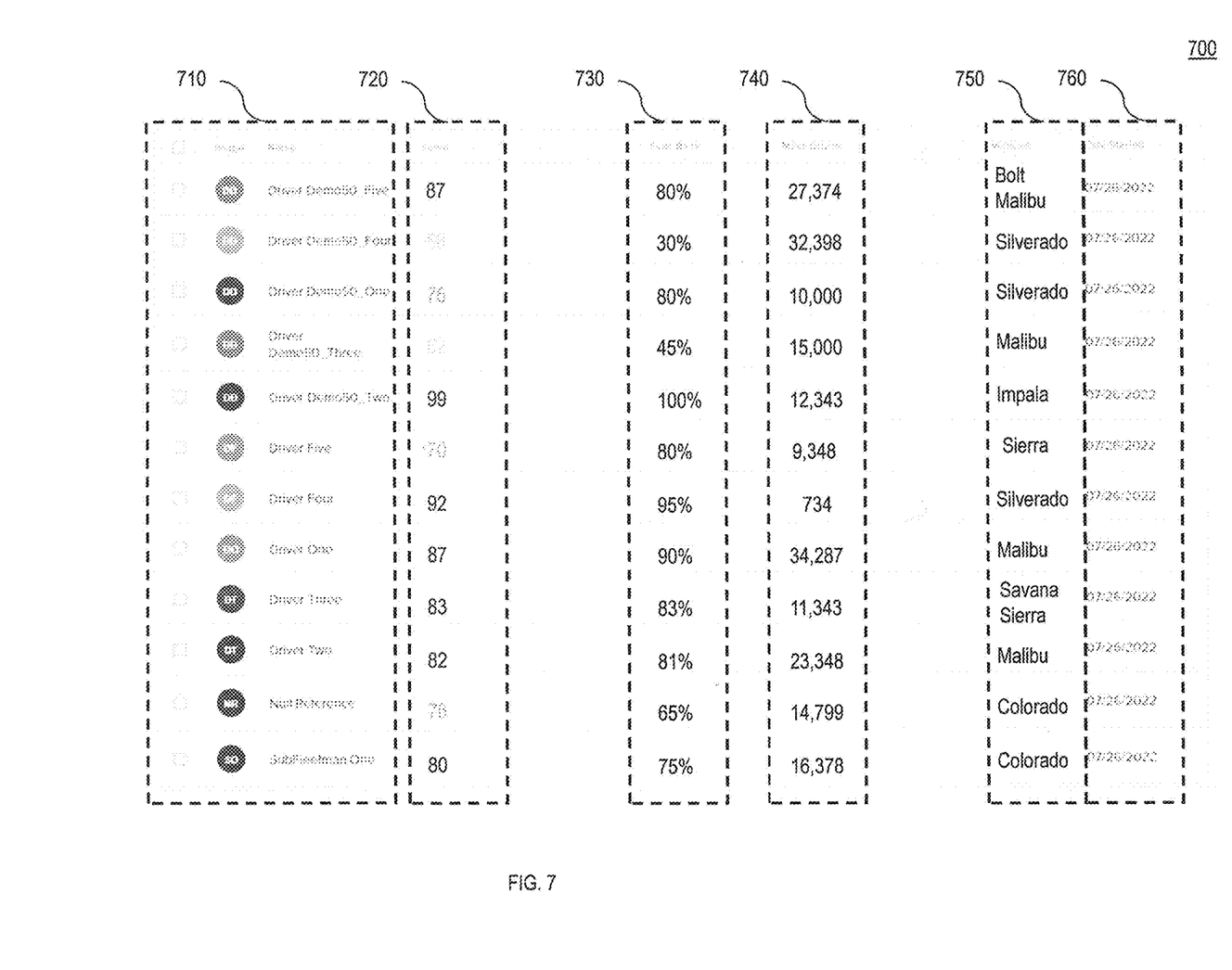
FIG. 7 is a graphical user interface of overall driver scores, in accordance with the disclosure.

FIG. 7 illustrates a graphical user interface 700 of results of a driver search engine module, according to an embodiment of the present disclosure. Graphical user interface 700 includes a listing 710 of drivers, a listing 720 of latest trip scores, a listing 730 of a fleet rank, a listing 740 of miles driven, a listing 750 of the vehicles driven by driver, and a listing 760 of a starting date within the fleet.

Figure 8:
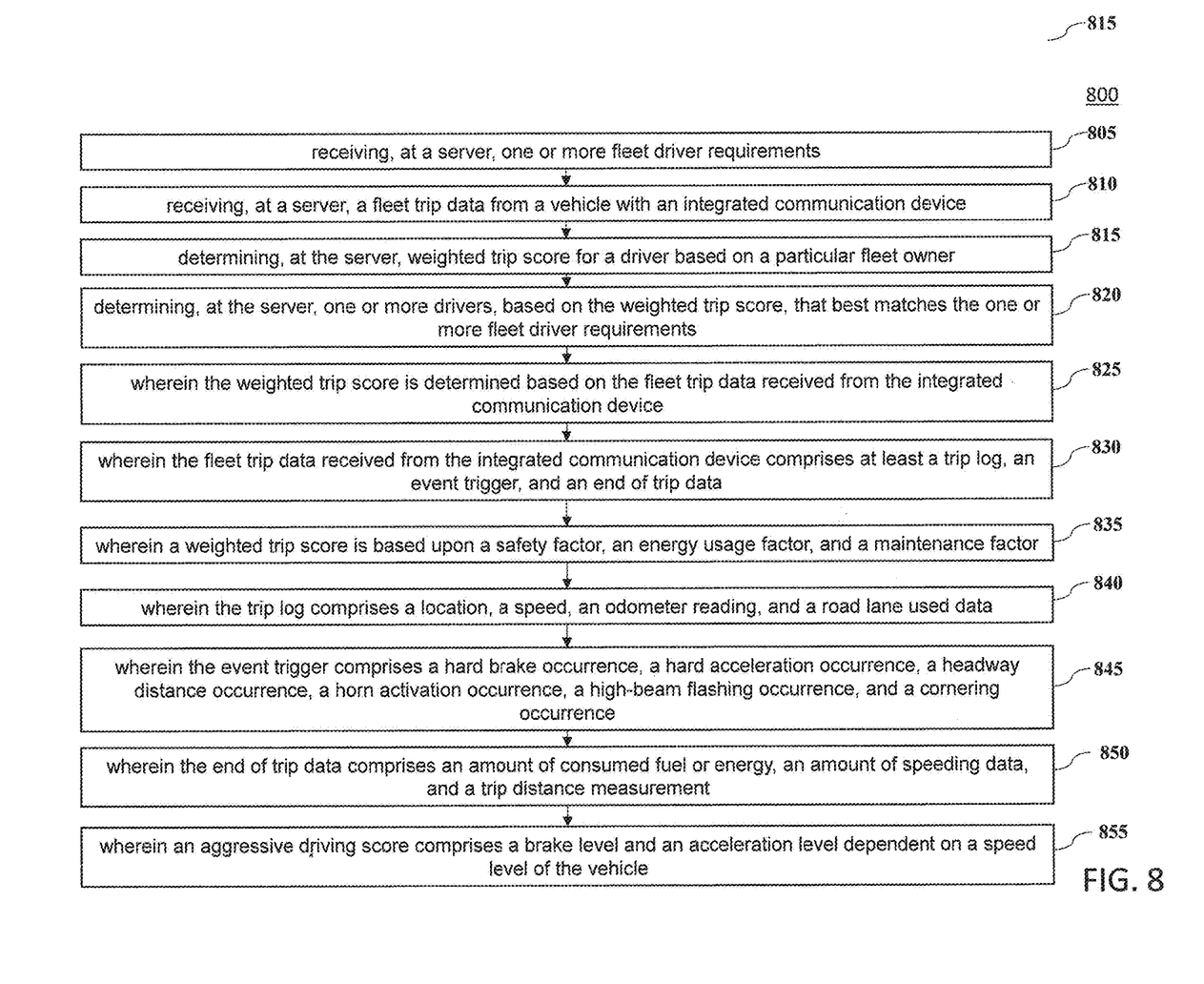
FIG. 8 is a flowchart of a method for determining driver assignments based on fleet trips history logs, in accordance with the disclosure.

FIG. 8 shows an exemplary embodiment of a method 800 for determining driver assignment based on fleet trips history logs, according to an embodiment of the present disclosure. Method 800 begins at step 805 with receiving, at a server, one or more fleet driver requirements. The server, which may also be referred to as an online platform, may allow a fleet owner to specify an importance of a number of driving score elements. As discussed in FIG. 2, the apply filters module 245 may include input from fleet managers, owners, or recruiters based on their specific driver requirements. For example, in FIG. 5 the score preference weights input 520 may be used by the fleet owner to customize their requirements, such as the importance of an aggressiveness factor, an energy factor, and a maintenance cost factor.

At step 810 the server may also receive fleet trip data from a vehicle with an integrated communication device. As discussed in FIG. 1, the vehicle may be of a certain type, for example a tractor-trailer 110, a truck 115, or a sedan 120. The vehicle may also include an integrated communication device within the vehicle that allows the vehicle to communicate with servers, such as online platform 140 and its associated storage 150. The fleet trip data, as discussed in FIG. 3 with trip data 310, may include data captured and processed by onboard sensors and microcontrollers that may include weight sensors, location, speed, global positioning system (GPS) location including lane usage. The trip data 310 captured and sent by the vehicle may also include the degree of hard braking and hard acceleration, horn usage, headway distance, and harsh cornering to name a few.

At step 815 the server may determine a weighted trip score for a driver based on a particular fleet owner. As discussed in FIG. 5, drivers may be scored differently for different fleet owners as different fleet owners may have different preferences for the various driving score elements. Some owners may value fuel efficiency over maintenance costs and therefore by using the score preference weights input 520 the various factors may be given different weights. As discussed in FIG. 3, the aggressiveness measures score 330 may utilize various elements to determine an aggressiveness score as shown in FIG. 4. The aggressiveness score may be determined based on speed dependent hard braking and hard acceleration and also a percentage of time spent in a highspeed passing lane. Further, as shown in FIG. 4, a graph of usual, or acceptable aggressiveness may be considered as the area bound by graph line 410 and graph line 420.

At step 820 the server may determine one or more drivers that best match the fleet driver requirements of a fleet owner. The matching may, in part, be based on the determination of the weighted trip score. As described in FIG. 5, results of the simulator module 560 and building utility function 540 may be used by solver 580 to calculate a marginal utility for the drivers and a fleet owner and further rank drivers according to their marginal utility score. Through a graphical user interface as shown in output 590 and in FIG. 6 and FIG. 7, the fleet owner may then select a driver.

At step 825 the weighted trip score may be determined based on the fleet trip data received from the integrated communication device as discussed in FIG. 1. Further, in step 830, the fleet trip data received from the integrated communication device may include at least a trip log, an event trigger, and an end of trip data. As discussed in FIG. 3, trip data 310 indicates that trip logs may contain information from the vehicle relating to its location, speed, odometer reading and which lane of a road it is in. Trip data 310 further indicates that event triggers may include sensors and controllers to detect hard braking and acceleration, monitoring of headway distances, activation of horn, high beam flashing and harsh cornering. Trip data 310 may also include end of trip data, for example an amount of consumed fuel/energy during the trip, a distance of the trip, and speed data recorded during the trip.

At step 835 the weighted trip score may be based upon an aggressiveness factor, an energy usage factor, and a maintenance factor. As discussed in FIG. 3, flowchart 300 illustrates the use of a fuel/energy efficiency score 320, an aggressiveness measures score 330, a maintenance score 340 that may then be used to determine, using a normalized reference grading module 350, a weighted trip score 360.

At step 840 the trip log may include a location, a speed, an odometer reading, and a road lane used data for the vehicle. As discussed in FIG. 3 the vehicle may capture and transmit the trip log data to an online platform, such as online platform 140.

At step 845 an event trigger may include a hard brake occurrence, a hard acceleration occurrence, a headway distance occurrence, a horn activation occurrence, a high beam flashing occurrence, and a cornering occurrence. As discussed in FIG. 3, event triggers may include multiple types of actions that may be considered aggressive, for example the use of hard braking and hard acceleration, minimal headway distance, excessive use of a horn or flashing of high-beam, or harsh cornering.

At step 850 the vehicle may also transmit end of trip data to an online platform where the end of trip data may include an amount of consumed fuel or energy, an amount of speeding data, and a trip distance measurement. As discussed in FIG. 3, this data may be used by the fuel/energy efficiency score 320 to determine whether the use of fuel or energy was efficient. In addition, the speeding data may also be used by the aggressiveness measures score 330 in determining an aggressiveness factor of the driver.

At step 855 an aggressive driving score comprises a brake level and an acceleration level dependent on a speed level of the vehicle. As discussed in FIG. 3, the weighted trip score 360 may be derived in part from the aggressiveness measures score 330 that includes an aggressiveness score as further graphed in FIG. 4.

Method 800 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for determining driving assignments based on fleet trips history logs comprising:
   an online platform, configured to receive one or more fleet driver requirements;
   a vehicle comprising an integrated communication device;
   the online platform, communicatively coupled to the integrated communication device;
   configured to exchange a fleet trip data between the integrated communication device and the online platform;
   the online platform, further configured to determine weighted trip score for a driver based on a particular fleet owner; and
   the online platform, further configured to determine one or more drivers, based on the weighted trip score, that best matches the one or more fleet driver requirements;
   wherein the weighted trip score is determined based on the fleet trip data received from the integrated communication device; and
   wherein the fleet trip data received from the integrated communication device comprises at least a start trip information, a trip log, an event trigger, and an end of trip data.

2. The system of claim 1, wherein the online platform is further configured to present, in a user interface, a plurality of possible fleet drivers based on the weighted trip score of each fleet driver.

3. The system of claim 1, wherein the weighted trip score is further based upon an aggressiveness factor, an energy usage factor, and a maintenance factor.

4. The system of claim 1, wherein the trip log comprises a location, a speed, an odometer reading, and a road lane used data.

5. The system of claim 4, wherein the road lane used data comprises a percentage of time the vehicle travels in a highspeed passing lane.

6. The system of claim 1, wherein the event trigger comprises a hard brake occurrence, a hard acceleration occurrence, a headway distance occurrence, a horn activation occurrence, a high beam flashing occurrence, and a cornering occurrence.

7. The system of claim 1, wherein the end of trip data comprises an amount of consumed fuel or energy, an amount of speeding data, and a trip distance measurement.

8. The system of claim 1, wherein an aggressive driving score comprises a brake level and an acceleration level dependent on a speed level of the vehicle.

9. The system of claim 1, wherein the weighted trip score is further based on a vehicle type, a trailer information, and a type of road.

10. The system of claim 3, wherein the maintenance factor comprises a tire wear score and a brake pad wear score.

11. A method for determining driver assignments based on fleet trips history logs comprising:
- receiving, at a server, one or more fleet driver requirements;
- receiving, at the server, a fleet trip data from a vehicle with an integrated communication device;
- determining, at the server, a weighted trip score for a driver based on a particular fleet owner; and
- determining, at the server, one or more drivers, based on the weighted trip score, that best matches the one or more fleet driver requirements;
- wherein the weighted trip score is determined based on the fleet trip data received from the integrated communication device; and
- wherein the fleet trip data received from the integrated communication device comprises at least a start trip information, a trip log, an event trigger, and an end of trip data.

12. The method of claim 11, wherein the weighted trip score is based upon an aggressiveness factor, an energy usage factor, and a maintenance factor.

13. The method of claim 11, wherein the trip log comprises a location, a speed, an odometer reading, and a road lane used data.

14. The method of claim 13, wherein the road lane used data comprises a percentage of time the vehicle travels in a highspeed passing lane.

15. The method of claim 11, wherein the event trigger comprises a hard brake occurrence, a hard acceleration occurrence, a headway distance occurrence, a horn activation occurrence, a high beam flashing occurrence, and a cornering occurrence.

16. The method of claim 11, wherein the end of trip data comprises an amount of consumed fuel or energy, an amount of speeding data, and a trip distance measurement.

17. The method of claim 11, wherein an aggressive driving score comprises a brake level and an acceleration level dependent on a speed level of the vehicle.

18. The method of claim 11, wherein the weighted trip score is further based on a vehicle type, a trailer information, and a type of road.

19. The method of claim 12, wherein the maintenance factor comprises a tire wear score and a brake pad wear score.

* * * * *